(12) United States Patent
Petersen

(10) Patent No.: US 11,496,051 B2
(45) Date of Patent: Nov. 8, 2022

(54) POWER CONVERTER

(71) Applicant: Dialog Semiconductor (UK) Limited, London (GB)

(72) Inventor: Holger Petersen, Pastetten (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 17/123,417

(22) Filed: Dec. 16, 2020

(65) Prior Publication Data

US 2022/0190724 A1 Jun. 16, 2022

(51) Int. Cl.
*H02M 3/158* (2006.01)
*H02M 1/44* (2007.01)
*H02M 3/156* (2006.01)

(52) U.S. Cl.
CPC ............ *H02M 3/1582* (2013.01); *H02M 1/44* (2013.01); *H02M 3/1566* (2021.05)

(58) Field of Classification Search
CPC .... H02M 3/1582; H02M 3/1566; H02M 1/44; H02M 3/07; H02M 1/088; H02M 3/158
See application file for complete search history.

(56) References Cited

U.S. PATENT DOCUMENTS

| | | | |
|---|---|---|---|
| 6,963,497 B1 | 11/2005 | Herbert | |
| 7,230,405 B2 | 6/2007 | Jang et al. | |
| 7,782,027 B2 | 8/2010 | Williams | |
| 8,427,113 B2 | 4/2013 | Xing et al. | |
| 9,559,589 B2 | 1/2017 | Petersen | |
| 9,768,682 B2 | 9/2017 | Banag | |
| 9,948,177 B2 | 4/2018 | Alarcon-Cot | |
| 10,003,261 B2 | 6/2018 | Petersen et al. | |

(Continued)

FOREIGN PATENT DOCUMENTS

| DE | 102015209330 A1 | 11/2016 |
|---|---|---|
| DE | 10 2015 212 331 A1 | 1/2017 |

(Continued)

OTHER PUBLICATIONS

"Multi-Level Conversion: High Voltage Choppers and Voltage-Source Inverters," by T.A. Meynard et al., PESC '92 Record. 23rd Annual IEEE Power Electronics Specialists Conference, Jun. 29-Jul. 3, 1992, pp. 397-403.

(Continued)

*Primary Examiner* — Adolf D Berhane
(74) *Attorney, Agent, or Firm* — Saile Ackerman LLC; Stephen B. Ackerman

(57) ABSTRACT

A power converter includes two flying capacitors coupled to a network of switches, two inductors and a driver. The network of switches has a first switch to couple the first flying capacitor to a first port, a first ground switch to couple the first flying capacitor to ground, a second switch to couple the second flying capacitor to the first port, a second ground switch to couple the second flying capacitor to ground. The driver drives the network of switches with a sequence of states comprising a first state. In the first state the first port is coupled to a second port via a first path and a second path. The first path includes the first switch, the first flying capacitor and the first inductor. The second path includes the second switch, the second flying capacitor and the second inductor; the ground port is decoupled from the second port.

15 Claims, 9 Drawing Sheets

(56) References Cited

U.S. PATENT DOCUMENTS

| | | |
|---|---|---|
| 10,075,080 B1 | 9/2018 | Scoones |
| 10,218,255 B1 | 2/2019 | Petersen |
| 10,230,302 B2 | 3/2019 | Petersen |
| 10,256,729 B1 | 4/2019 | Notsch |
| 10,291,117 B2 | 5/2019 | Petersen |
| 10,389,237 B1 | 8/2019 | Chee et al. |
| 10,530,256 B1 | 1/2020 | Jayaraman |
| 10,547,241 B1 | 1/2020 | Li |
| 10,615,697 B1 | 4/2020 | Ferrari |
| 10,622,890 B1 | 4/2020 | Lidsky et al. |
| 10,637,352 B2 | 4/2020 | Illiano |
| 10,727,747 B2 | 7/2020 | Macri |
| 10,756,623 B1 | 8/2020 | Petersen |
| 10,790,742 B1 | 9/2020 | Petersen |
| 10,804,798 B1 | 10/2020 | Rizzolatti |
| 10,811,974 B1 | 10/2020 | Petersen |
| 10,826,395 B2 | 11/2020 | Song |
| 10,879,801 B2 | 12/2020 | Zhang et al. |
| 11,005,371 B2 | 5/2021 | Cannillo |
| 11,011,988 B1 | 5/2021 | Jefremow |
| 11,011,991 B1 | 5/2021 | Mercer |
| 11,228,243 B2 * | 1/2022 | Petersen ............... H02M 1/088 |
| 2001/0022735 A1 | 9/2001 | Zanuccoli |
| 2008/0079393 A1 | 4/2008 | Spartano et al. |
| 2008/0157732 A1 | 7/2008 | Williams |
| 2008/0158915 A1 | 7/2008 | Williams |
| 2008/0239772 A1 | 10/2008 | Oraw et al. |
| 2009/0033289 A1 | 2/2009 | Xing et al. |
| 2009/0174466 A1 | 7/2009 | Hsieh et al. |
| 2010/0188065 A1 | 7/2010 | Shiwaya |
| 2011/0062940 A1 | 3/2011 | Shvartsman |
| 2013/0147543 A1 | 6/2013 | Dai et al. |
| 2014/0070787 A1 | 3/2014 | Arno |
| 2015/0015088 A1 | 1/2015 | Petersen |
| 2015/0061613 A1 | 3/2015 | Kondou |
| 2015/0084611 A1 | 3/2015 | Agrawal et al. |
| 2015/0280553 A1 | 10/2015 | Giuliano |
| 2015/0311793 A1 | 10/2015 | Khayat et al. |
| 2016/0344214 A1 | 11/2016 | Petersen et al. |
| 2016/0352218 A1 | 12/2016 | Stauth |
| 2017/0126146 A1 | 5/2017 | Petersen |
| 2017/0163157 A1 | 6/2017 | Petersen |
| 2017/0244318 A1 | 8/2017 | Giuliano |
| 2017/0279348 A1 | 9/2017 | Kulkarni |
| 2017/0302093 A1 | 10/2017 | Petersen |
| 2018/0026518 A1 | 1/2018 | Liu et al. |
| 2018/0175726 A1 | 6/2018 | Petersen |
| 2019/0149041 A1 | 5/2019 | Larsen |
| 2019/0207519 A1 | 7/2019 | Chakraborty |
| 2019/0280618 A1 | 9/2019 | Yan et al. |
| 2019/0341850 A1 | 11/2019 | Macri |
| 2019/0348913 A1 | 11/2019 | Zhang |
| 2020/0044578 A1 | 2/2020 | Mangudi |
| 2020/0091818 A1 | 3/2020 | Toni |
| 2020/0144909 A1 | 5/2020 | Baek |
| 2020/0212795 A1 | 7/2020 | Das |
| 2020/0295655 A1 | 9/2020 | Takahiro |
| 2020/0350817 A1 | 11/2020 | De |
| 2021/0050786 A1 | 2/2021 | Park |
| 2021/0099088 A1 | 4/2021 | Cannillo |
| 2021/0152082 A1 | 5/2021 | Ozanoglu |
| 2021/0152100 A1 | 5/2021 | Zillo |
| 2021/0203179 A1 | 7/2021 | Gambetta |
| 2021/0234462 A1 | 7/2021 | Cannillo et al. |
| 2021/0288576 A1 | 9/2021 | Rizzoletti |
| 2022/0038006 A1 | 2/2022 | Ellis |

FOREIGN PATENT DOCUMENTS

| | | |
|---|---|---|
| DE | 102015212331 A1 | 1/2017 |
| DE | 10 2016 217 040 A1 | 3/2018 |
| DE | 10 2019 002 880 A1 | 10/2019 |
| DE | 102019002880 A1 | 10/2019 |
| EP | 3582383 A2 | 12/2019 |
| WO | 2014/154390 A1 | 10/2014 |

OTHER PUBLICATIONS

"A Fully-Integrated Switched-Capacitor 2:1 Voltage Converter with Regulation Capability and 90% Efficiency at 2.3A/mm$^2$," by Leland Chang et al., 2010 Symposium on VLSI Circuits/Technical Digest of Technical Papers, Jul. 2010, pp. 55-56.

"A Flying Capacitor Multilevel Converter with Sampled Valley-Current Detection for Multi-Mode Operation and Capacitor Voltage Balancing," by Jan S. Rentmeister et al., 2016 IEEE Energy Conversion Congress and Exposition (ECCE), Sep. 18-22, 2016, 8 pages.

"Hybrid Buck Converter Optimization and Comparison for Smart Phone Integrated Battery Chargers," by Gabriel Gabian et al., 2018 IEEE Applied Power Electronics Conference and Exposition (APEC), Mar. 4-8, 2018, pp. 2148-2154.

"72 V Hybrid DC-to-DC Converter Reduces Intermediate Bus Converter Size by up to 50%," by Bruce Haug, Analog Dialogue 52-02, Feb. 2018, found: analogdialogue.com, pp. 1-3.

German Office Action, File No. 10 2020 200 927.9, Applicant: Dialog Semiconductor (UK) Limited, dated Jul. 7, 2020, 6 pages.

Co-Pending US Patent, "A Power Converter," U.S. Appl. No. 16/900,669, filed Jun. 12, 2020, by Holger Petersen, 72 pages.

Co-Pending US Patent, "A Power Converter," U.S. Appl. No. 16/900,678, filed Jun. 12, 2020, by Holger Petersen, 70 pages.

Co-Pending US Patent, "Hybrid Multi-Level Power Converter With Inter-Stage Inductor," U.S. Appl. No. 16/919,928, filed Jul. 2, 2020, by Fancesco Cannillo et al., 33 pages.

U.S. Notice of Allowance, U.S. Appl. No. 16/900,669, Applicant: Holger Petersen, dated Sep. 27, 2021, 29 pages.

U.S. Office Action, U.S. Appl. No. 16/900,678, Applicant: Holger Petersen, dated Aug. 13, 2021, 24 pages.

German Office Action, File No. 10 2020 213 004.3, Applicant: Dialog Semiconductor (UK) Limited, dated Jun. 24, 2021, 6 pages.

German Office Action, File No. 10 2020 213 005.1, Applicant: Dialog Semiconductor (UK) Limited, dated Jun. 24, 2021, 6 pages.

Co-Pending US Patent, U.S. Appl. No. 16/919,928, filed Jul. 2, 2020, Inventor: Cannilo et al., "Hybrid multi-level power converter with inter-state inductor," 33 pages.

Co-Pending US Patent, U.S. Appl. No. 16/386,735, filed Apr. 17, 2019, Inventor: Holger Petersen, "A Power Converter," 37 pages.

U.S. Notice of Allowance, U.S. Appl. No. 16/386,735, First Named Inventor: Holger Petersen, dated Jun. 10, 2020, 13 pages.

U.S. Office Action, U.S. Appl. No. 16/386,735, Applicant: Holger Petersen, dated Feb. 10, 2020, 21 pages.

"Split-Phase Control: Achieving Complete Soft-Charging Operation of a Dickson Switched-Capacitor Converter," by Yutian Lei et al., IEEE Transactions on Power Electronics, vol. 31, No. 01, Jan. 2016, pp. 770-782.

"A Hybrid Dual-Path Step-Down Converter with 96.2% Peak Efficiency using a 250mΩ Large-DCR Inductor," by Yeunhee Huh et al., 2018 Symposium on VLSI Circuits Digest of Technical Papers, Jun. 18-22, 2018, pp. 225-226.

"A Hybrid Structure Dual-Path Step-Dwon Converter With 96.2% Peak Efficiency Using 250-mΩ Large-DCE Inductor," by Yuenhee Huh et al., IEEE Journal of Solid-State Circuits, vol. 54, No. 4, Apr. 2019, pp. 959-967.

"Multiphase buck converters with extended duty cycle," by Yungtaek Jang et al., Twenty-First Annual IEEE Applied Power Electronics Conference and Exposition, APEC '06, Mar. 19-23, 2006, pp. 38-44.

"A Hybrid Inductor-Based Flying-Capacitor-Assisted Step-Up/Step-Down DC-DC Converter with 96.56% Efficiency," by Yong-Min Ju et al., 2017 IEEE International Solid-State Circuits Conference (ISSCC), Feb. 5-9, 2017, pp. 184-186.

"A Fully-Integrated 3-Level DC-DC Converter for Nanosecond-Scale DVFX," by Wonyoung Kim et al., IEEE Journal of Solid-State Circuits, vol. 47, No. 1, Jan. 2012, pp. 206-219.

"A Hybrid Switched-Capacitor/lnductor Converter for Small Conversion Ratios," by Norah Elena Nakibuuka, Thesis: M. Eng., Massachusetts Institute of Technology, Department of Electrical Engineering and Computer Science, 2013, May 2013, 69 pages.

(56) References Cited

OTHER PUBLICATIONS

"Analysis of Double Step-Down Two-Phase Buck Converter for VRM," by K. Nishijima et al, INTELEC 05—Twenty-Seventh International Telecommunications Conference, Sep. 18-22, 2005, pp. 497-502.

"Right-Half-Plane Zero Elimination of Boost Converter Using Magnetic Coupling With Forward Energy Transfer," by Behzad Poorali et al., IEEE Transactions on Industrial Electronics, vol. 66, No. 11, Nov. 2019, pp. 8454-8462.

"Fully Integrated Buck Converter with 78% Efficiency at 365mW Output Power Enabled by Switched-Inductor-Capacitor Topology and Inductor Current Reduction Technique," by Nghia Tang et al., 2019 IEEE International Solid-State Circuits Conference—(ISSCC), Feb. 17-21, 2019, pp. 153-154.

"A New Approach to Low Ripple-Noise Switching Converters on the Basis of Switched-Capacitor Converters," by Tohru Umeno et al., 1991., IEEE International Sympoisum on Circuits and Systems, Jun. 11-14, 1991, pp. 1077-1080.

"Zero Inductor Voltage Multilevel Bus Converter," by Samuel Webb et al., 2018 IEEE Applied Power Electronics Conference and Exposition (APEC), Mar. 4-8, 2018, pp. 2175-2182.

"Three-Level Buck Converter for Envelope Tracking Applications," by Vahid Yousefzadeh et al., IEEE Transactions on Power Electronics, vol. 21, No. 2, Mar. 2006, pp. 549-552.

U.S. Office Action, U.S. Appl. No. 16/919,928, Applicant: Cannillo et al., dated Jan. 27, 2022, 22 pages.

German Office Action, File No. 10 2020 200 927.9, Applicant: Dialog Semiconductor (UK) Limited, dated Feb. 24, 2022, 5 pages.

U.S. Office Action, U.S. Appl. No. 17/110,765, Applicant: Holger Petersen, dated May 10, 2022, 12 pages.

U.S. Notice of Allowance, U.S. Appl. No. 16/900,678, Applicant: Holger Petersen, dated Jun. 3, 2022, 20 pages.

\* cited by examiner

910

Providing a power converter having a ground port, a first port, and a second port, wherein when the power converter operates as a step-down converter the first port receives an input voltage and the second port provides an output voltage and when the power converter operates as a step-up converter the second port receives an input voltage and the first port provides the output voltage

920

Driving a network of switches with a sequence of states during a drive period, the sequence of states comprising a first state, wherein in the first state the first port is coupled to the second port via a first path and a second path, wherein the first path comprises a first switch, a first flying capacitor and a first inductor, and wherein the second path comprises a second switch, a second flying capacitor, and a second inductor; wherein the ground port is decoupled from the second port

FIG. 9

POWER CONVERTER

RELATED PATENT APPLICATION

This application is related to U.S. patent application Ser. No. 16/900,669, filed on Jun. 12, 2020, U.S. patent application Ser. No. 16/900,678, filed on Jun. 12, 2020, and U.S. patent application Ser. No. 17/110,765, filed on Dec. 3, 2020, all of which are owned by a common assignee, and all of which are herein incorporated by reference in their entirety.

TECHNICAL FIELD

The present disclosure relates to a power converter and a method of operating the same. In particular, the present disclosure relates to a power converter operable with an extended output-to-input voltage conversion ratio.

BACKGROUND

Conventional buck converters are often limited by significant conduction losses and electromagnetic interferences EMI. Multi-phase buck converters topologies with extended duty cycle have been reported which significantly reduce both conduction losses and electromagnetic noise. Examples of such power converters can be found in U.S. Pat. No. 7,230,405, as well as in the publications titled "Analysis of Double Step-Down Two-Phase Buck Converter for VRM", IEEE, 2005 by Nishijima, and "Multi-Phase Buck Converters with Extended Duty Cycle", IEEE, 2006 by Jang. Nevertheless, these multi-phase buck converters can only operate with a maximum output-to-input voltage conversion ratio of $V_{OUT}/V_{IN}=¼$. These topologies operate with a 50% duty cycle for a 1:4 conversion ratio, so that no regulation of the output voltage is possible. In order to enable some regulation for coping with a potential sudden increase in load current, the maximum duty cycle of the converter has to be reduced, for instance by about 30%. In this scenario the maximum output voltage decreases to $V_{OUT}\sim V_{IN}/6$.

Many applications rely on a battery for providing the input voltage Vin to the converter. Over time the input voltage may drop by about 50% or more as the battery depletes. In this case the output-to-input conversion ratio of the above mentioned multi-phase converters may not be enough to maintain a desired output voltage. There is therefore a need for a power converter supporting an extended output-to-input voltage conversion ratio $V_{OUT}/V_{IN}$ with higher efficiency than a conventional buck converter.

SUMMARY

According to a first aspect of the disclosure, there is provided a power converter for providing an output voltage with an output-to-input conversion ratio, the power converter having a ground port, a first port, and a second port, wherein when the power converter operates as a step-down converter the first port receives an input voltage and the second port provides the output voltage and when the power converter operates as a step-up converter the second port receives an input voltage and the first port provides the output voltage; the power converter comprising a first flying capacitor and a second flying capacitor coupled to a network of switches, a first inductor between the first flying capacitor and the second port; a second inductor between the second flying capacitor and the second port; and a driver; the network of switches comprising a first switch to couple the first flying capacitor to the first port; a first ground switch to couple the first flying capacitor to ground; a second switch to couple the second flying capacitor to the first port; a second ground switch to couple the second flying capacitor to ground; the driver being adapted to drive the network of switches with a sequence of states during a drive period, the sequence of states comprising a first state, wherein in the first state the first port is coupled to the second port via a first path and a second path, wherein the first path comprises the first switch, the first flying capacitor and the first inductor, and wherein the second path comprises the second switch, the second flying capacitor and the second inductor; wherein the ground port is decoupled from the second port.

Optionally, the sequence of states comprises a second state configured to magnetize the first inductor and de-magnetize the second inductor when the power converter operates as a step-down converter or to de-magnetize the first inductor and magnetize the second inductor when the power converter operates as a step-up converter.

Optionally, the sequence of states comprises a third state configured to de-magnetize the first inductor and magnetize the second inductor when the power converter operates as a step-down converter or to magnetize the first inductor and de-magnetize the second inductor when the power converter operates as a step-up converter.

Optionally, the driver is adapted to maintain the first state, the second state and the third state for a same predetermined duration during the drive period.

Optionally, the sequence of states comprises multiple occurrences of the first state, and wherein a sum of the multiple occurrences of the first state last for a same duration as the duration of the second state or the duration of the third state.

Optionally, the sequence of states is provided with two occurrences of the first state.

Optionally, the driver is adapted to maintain the second state and the third state for a same predetermined duration, and to maintain the first occurrence of the first state and the second occurrence of the first state for a duration equal to half the predetermined duration of the second and third states.

Optionally, the power converter comprises a first inductor switch and a second inductor switch, wherein the first inductor switch has a first terminal coupled to the first switch and the first flying capacitor and a second terminal coupled to the second inductor; and wherein the second inductor switch has a first terminal coupled to the second switch and the second flying capacitor and a second terminal coupled to the first inductor.

Optionally, in the second state the ground port is coupled to the second port via a path comprising the second ground switch the second flying capacitor, the second inductor switch and the first inductor and via another path comprising the second ground switch and the second inductor; and wherein in the third state the ground port is coupled to the second port via a path comprising the first ground switch, the first flying capacitor, the first inductor switch and the second inductor and via another path comprising the first ground switch and the first inductor.

Optionally, wherein the sequence of states comprises a fourth state in which the ground port is coupled to the second port via a path comprising the second ground switch, the second flying capacitor, the second inductor switch and the first inductor and via another path comprising the second ground switch and the second inductor, and wherein the first port is coupled to the second port via a path comprising the first switch, the first flying capacitor and the first inductor.

Optionally, the sequence of states comprises a fifth state in which the ground port is coupled to the second port via a path comprising the first ground switch, the first flying capacitor, the first inductor switch and the second inductor and via another path comprising the first ground switch and the first inductor, and wherein the first port is coupled to the second port via a path comprising the second switch, the second flying capacitor and the second inductor.

Optionally, when the power converter operates as a step-down converter, the driver is configured to magnetize the first inductor and the second inductor for more than fifty percent of the drive period.

Optionally, when the power converter operates as a step-up converter, the driver is configured to de-magnetize the first inductor and the second inductor for more than fifty percent of the drive period.

Optionally, when the power converter operates as a step-down converter, the output-to-input conversion ratio is greater than 0.25. For instance, the output-to-input conversion ratio may be between ¼ and ⅓.

Optionally, when the power converter operates as a step-up converter, the output-to-input conversion ratio is smaller than 4. For instance, the output-to-input conversion ratio may be between 3 and 4.

According to a second aspect of the disclosure, there is provided a method of converting power with an output-to-input conversion ratio, the method comprising providing a power converter having a ground port, a first port, and a second port, wherein when the power converter operates as a step-down converter the first port receives an input voltage and the second port provides the output voltage and when the power converter operates as a step-up converter the second port receives an input voltage and the first port provides the output voltage; the power converter comprising a first flying capacitor and a second flying capacitor coupled to a network of switches, a first inductor between the first flying capacitor and the second port; a second inductor between the second flying capacitor and the second port; the network of switches comprising a first switch to couple the first flying capacitor to the first port; a first ground switch to couple the first flying capacitor to ground; a second switch to couple the second flying capacitor to the first port; a second ground switch to couple the second flying capacitor to ground; and driving the network of switches with a sequence of states during a drive period, the sequence of states comprising a first state, wherein in the first state the first port is coupled to the second port via a first path and a second path, wherein the first path comprises the first switch, the first flying capacitor and the first inductor, and wherein the second path comprises the second switch, the second flying capacitor and the second inductor; wherein the ground port is decoupled from the second port.

The options described with respect to the first aspect of the disclosure are also common to the second aspect of the disclosure.

BRIEF DESCRIPTION OF THE DRAWINGS

The disclosure is described in further detail below by way of example and with reference to the accompanying drawings, in which:

FIG. 9 is a flowchart for a method of converting power with an output-to-input conversion ratio.

DETAILED DESCRIPTION

Figure 1:
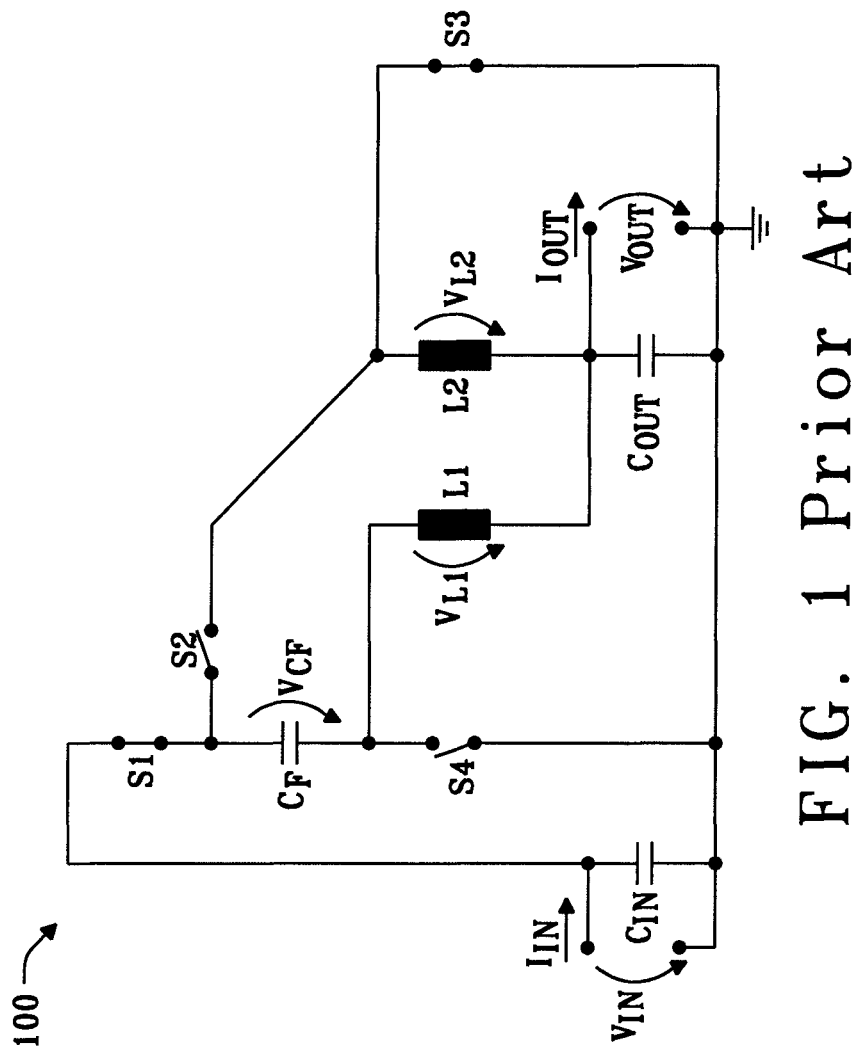
FIG. 1 is a diagram of a two-phase converter according to the prior art.

FIG. 1 shows the topology of a multi-phase converter as described in U.S. Pat. No. 7,230,405. The converter 100 includes a flying capacitor $C_F$, two inductors L1 and L2 and four switches S1, S2, S3 and S4.

In operation the switches are operated with a switching cycle TS. The conducting time of S1 and S2 define the Duty Cycle D of the converter. The switches S4 and S1 are conducting at complementary intervals. The switch S1 conducts during the duty cycle D, whereas S4 conducts during the remainder of the switching cycle TS. Similarly, the switches S3 and S2 are conducting at complementary intervals.

For a duty cycle D<0.5, the voltage $V_{CF}$ across the flying capacitor ideally converges to $$V_{CF} = \frac{V_{IN}}{2},$$

effectively resulting in a switching operation like a multi-phase buck converter with half the input voltage. Non-ideal timings, asymmetric parasitic impedance, and tolerances of components (inductors, capacitors) may result in asymmetric operation with the need to regulate the voltage across the flying capacitors, for instance via non-identical duty cycles for the magnetization of inductor $L_1$ and $L_2$.

Dropping the input voltage to $$\frac{V_{IN}}{2}$$

via the flying capacitors reduces inductor current ripple and enables a reduced voltage rating for the power FETs, S3 and S4. Devices with lower voltage rating have a smaller specific resistance and smaller gate capacitance. For a small voltage conversion ratio, the inductor demagnetization switches towards the ground terminal (the FETs S3 and S4) are the most heavily loaded current paths. The relationship between input and output voltage is obtained by applying the volt-second balance principle to the voltages across the two inductors $L_1$ and $L_2$:

$$\frac{V_{OUT}}{V_{IN}} = \frac{D}{2} \quad (1)$$

$$D \in [0, 0.5]$$

The maximum $V_{OUT}/V_{IN}$ conversion ratio (D=0.5) is less than $V_{OUT}/V_{IN}=\frac{1}{4}$.

At D>0.5 the magnetization phases for inductor $L_1$ and $L_2$ overlap and the switches S1 and S2 need to be closed in parallel. As a result, the switch S3 requires a double voltage rating. Moreover, the magnetization voltage across inductor $L_2$ would temporally rise to $V_L=V_{IN} V_{OUT}$ hence increasing inductor core loss and canceling most of the converter topology benefits.

Figure 2:
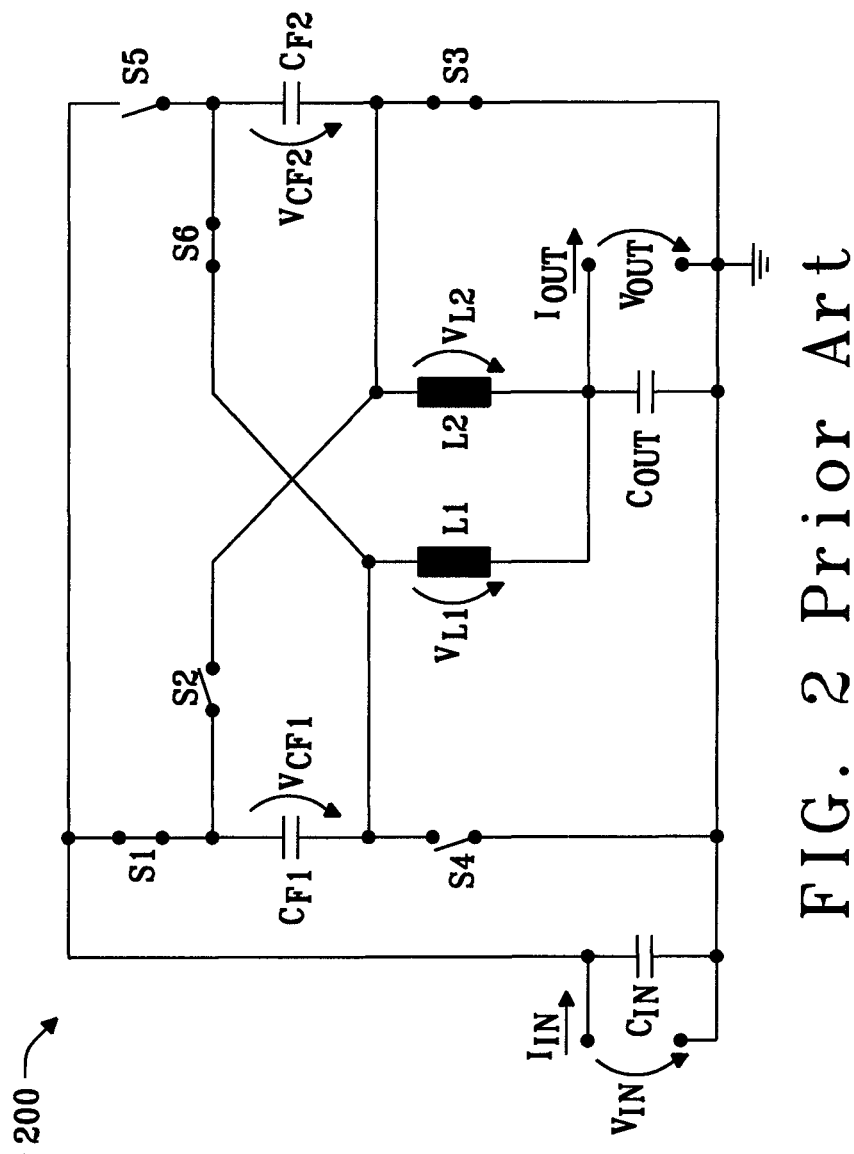
FIG. 2 is a diagram of another two-phase converter according to the prior art.

FIG. 2 shows another converter topology as described in the publications titled "Analysis of Double Step-Down Two-Phase Buck Converter for VRM", IEEE, 2005 by Nishijima, and "Multi-Phase Buck Converters with Extended Duty Cycle", IEEE, 2006 by Jang.

The converter 200 has two inductors L1 and L2, two flying capacitors $C_{F1}$ and $C_{F2}$, and six switches labelled S1 to S6. The converter 200 provides reduced conduction loss and 50% reduced input current ripple. In operation the flying capacitor voltages ideally converges to $$V_{CF1} = V_{CF2} = \frac{V_{IN}}{2} \quad (2)$$

$$D \in [0, 0.5]$$

at a voltage conversion ratio of $$\frac{V_{OUT}}{V_{IN}} = \frac{D}{2}.$$

Figure 3A:
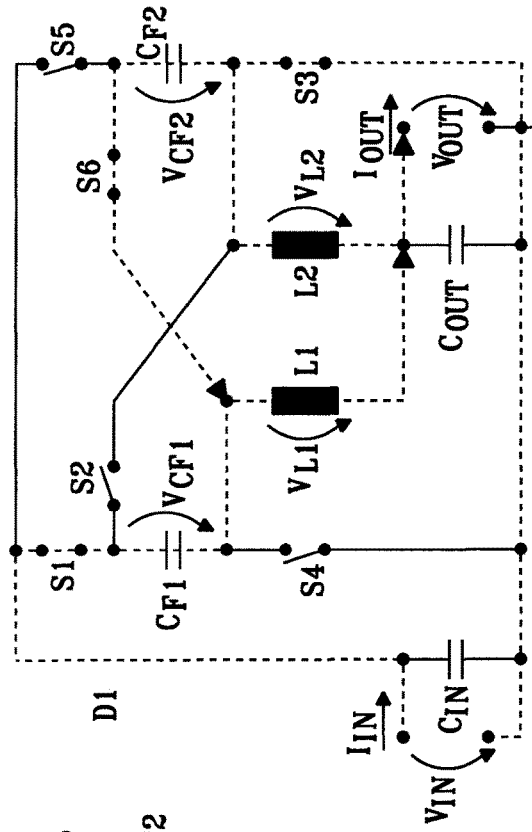
FIG. 3A is a diagram of a first switching state for operating the power converter of FIG. 2.
Figure 3B:
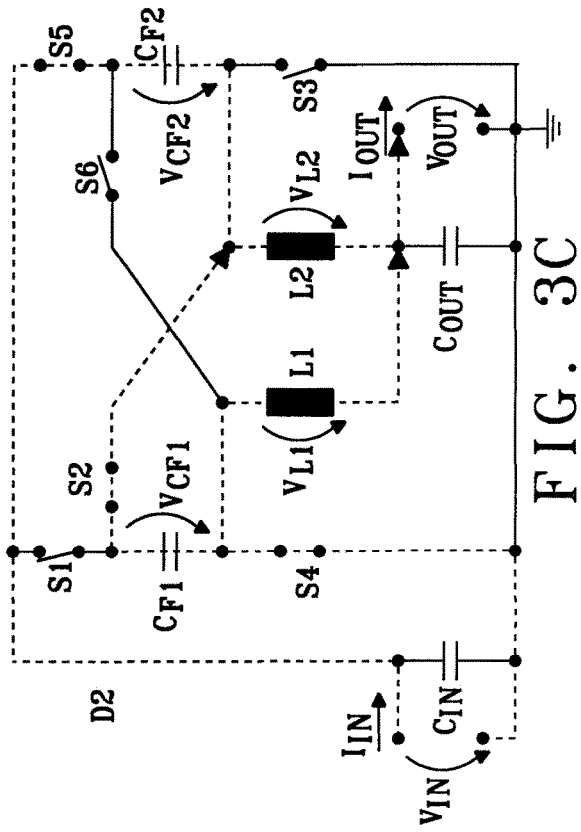
FIG. 3B is a diagram of a second switching state for operating the power converter of FIG. 2.
Figure 3C:
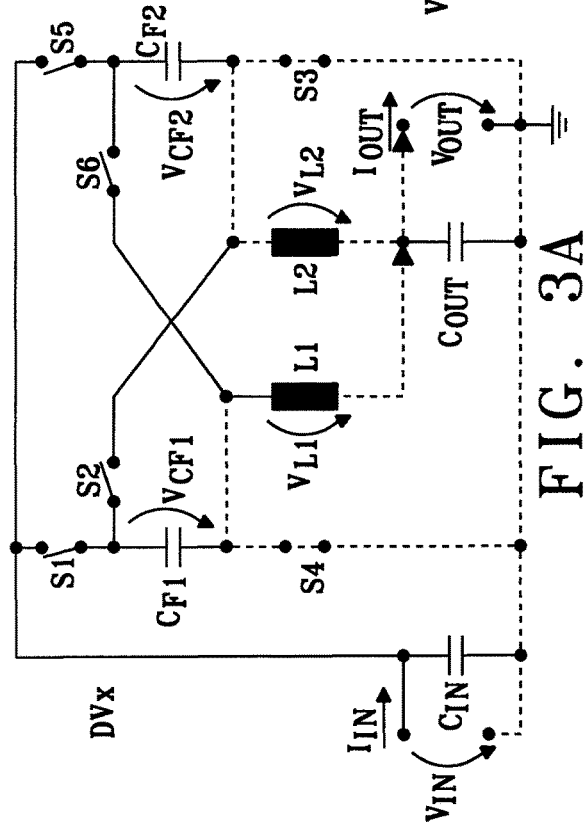
FIG. 3C is a diagram of a third switching state for operating the power converter of FIG. 2.
Figure 4A:
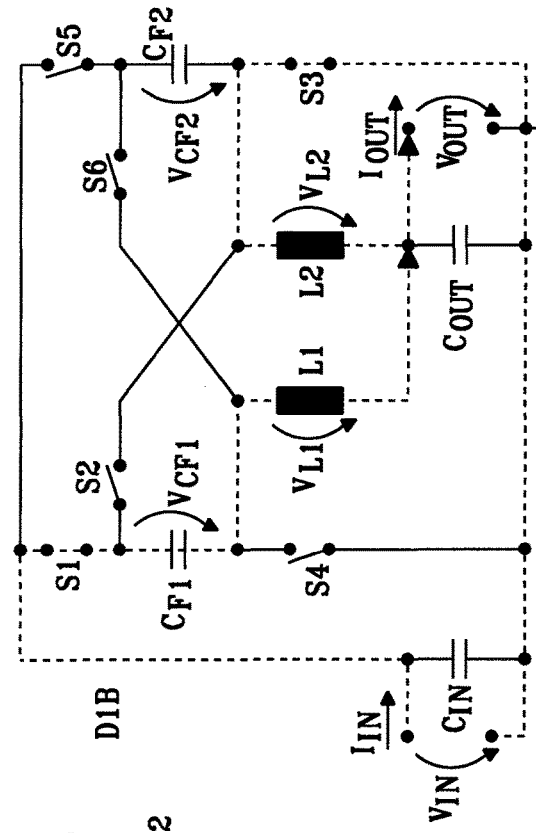
FIG. 4A is a diagram of a fourth switching state for operating the power converter of FIG. 2.
Figure 4B:
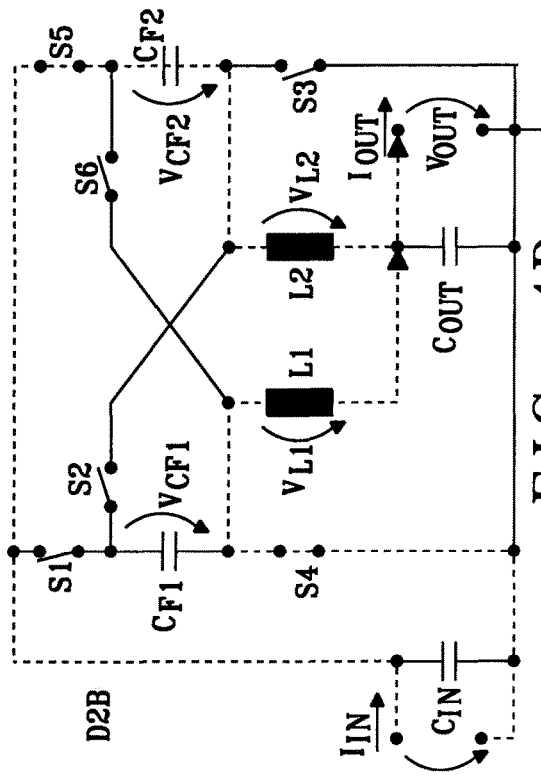
FIG. 4B is a diagram of a fifth switching state for operating the power converter of FIG. 2.
Figure 4C:
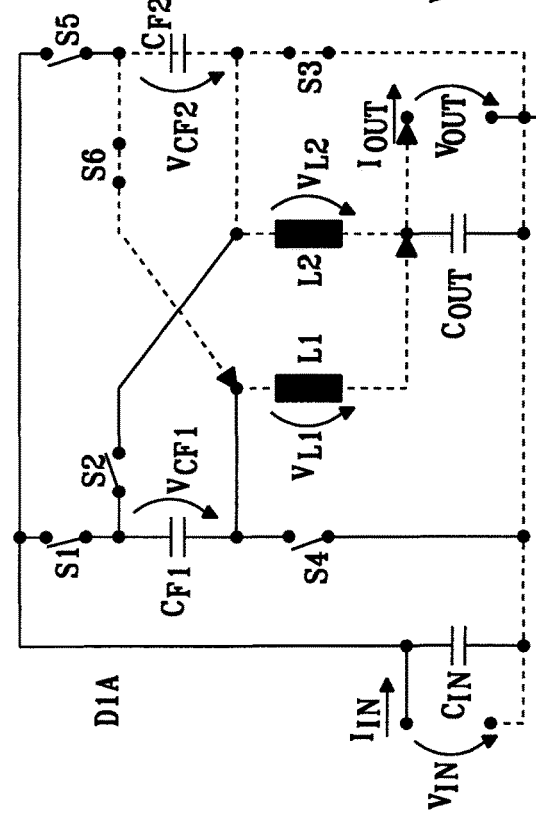
FIG. 4C is a diagram of a sixth switching state for operating the power converter of FIG. 2.
Figure 4D:
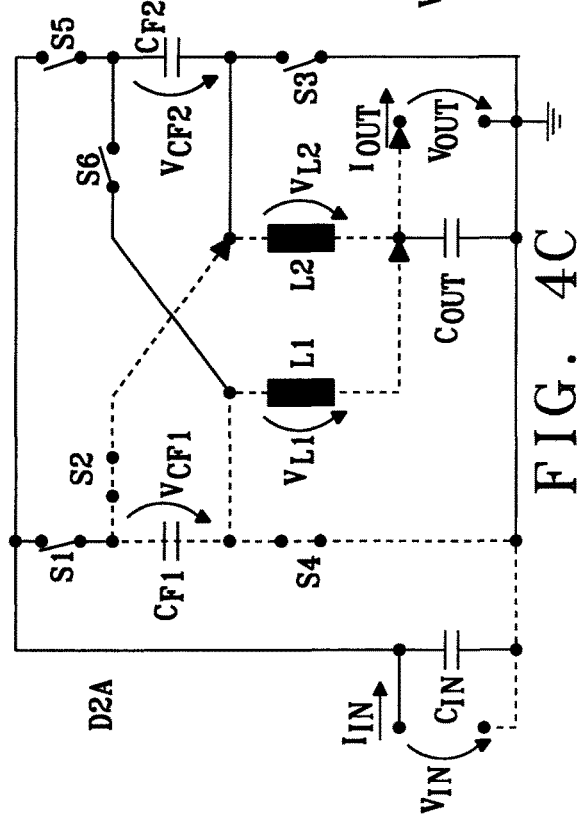
FIG. 4D is a diagram of a seventh switching state for operating the power converter of FIG. 2.

FIG. 3 illustrates three switching states of the converter 200. FIG. 3A shows a demagnetization state DVx during which both inductors L1 and L2 are demagnetized. FIG. 3B shows a magnetization state D1 for magnetizing inductor L1. FIG. 3C shows a magnetization state D2 for magnetizing inductor L2.

In the demagnetization state DVx, the ground terminal is coupled to the output terminal of the converter via a path that includes the switch S4 and the inductor L1, and another path that includes the switch S3 and the inductor L2. The remaining switches are open.

In the magnetization state D1, the input terminal is coupled to the output terminal via a magnetization path that includes S1, $C_{F1}$, and L1. The ground terminal is coupled to the output terminal via a path that includes S3, $C_{F2}$, S6 and L1; and another path that includes S3 and L2. The switches S2, S4 and S5 are turned off (open).

In the magnetization state D2, the input terminal is coupled to the output terminal via a magnetization path that includes S5, $C_{F2}$, and L2. The ground terminal is coupled to the output terminal via a path that includes S4, $C_{F1}$, S2 and L2; and another path that includes S4 and L1. The switches S1, S3 and S6 are turned off (open).

In each switching cycle, the converter 200 operates with a sequence of states in the following order: D1, DV1, D2, DV2, in which DV1 is the state DVx following D1 and DV2 is the state DVx following D2. This sequence is then repeated over time. The relationship between the input and the output voltage is obtained by applying the volt-second balance principle to the voltages of the two inductors $L_1$ and $L_2$:

$$\frac{V_{OUT}}{V_{IN}} = \frac{D}{2} \quad D1 = D2 = D, \quad (3)$$

$$DV1 = DV2 = \frac{1-2D}{D}$$

$$D \in [0, 0.5]$$

For a small voltage conversion ratio, the converter 200 operates for most of its switching cycle in the de-magnetization state DVx during which both inductors L1 and L2 are de-magnetized with the provision of an output current from the ground node. To fulfill the volt-second balance across the inductors a certain duration of the switching sequence must be configured according to the switching state D1 and switching state D2 for magnetizing of inductors $L_1$ and $L_2$ respectively. The circuit 200 may also be operated in a so-called 4 phases interleaved operation by splitting the states D1 and D2 in two subs states D1A, D1B and D2A, D2B respectively.

FIG. 4 illustrates four switching states for operating the converter 200 in an interleaved mode. FIGS. 4A and 4B show the states D1A and D1B, respectively. FIGS. 4C and 4D show the states D2A and D2B, respectively.

In the state D1A, the ground terminal is coupled to the output terminal via a magnetization path that includes S3, $C_{F2}$, S6 and L1 for magnetizing L1; and de-magnetization path that includes S3 and L2 for de-magnetizing L2. The switches S1, S2, S4 and S5 are turned off (open).

In the state D1B, the input terminal is coupled to the output terminal via a magnetization path that includes S1, $C_{F1}$, and L1, for magnetizing L1. The ground terminal is coupled to the output terminal via a de-magnetization path that includes S3 and L2 for de-magnetizing L2. The switches S2, S4, S5 and S6 are turned off (open).

In the state D2A, the ground terminal is coupled to the output terminal via a magnetization path that includes S4, $C_{F1}$, S2 and L2 for magnetizing L2; and de-magnetization path that includes S4 and L1 for de-magnetizing L1. The switches S1, S3, S5 and S6 are turned off (open).

In the state D2B, the input terminal is coupled to the output terminal via a magnetization path that includes S5, $C_{F2}$, and L2, for magnetizing L2. The ground terminal is coupled to the output terminal via a de-magnetization path that includes S4 and L1 for de-magnetizing L1. The switches S1, S2, S3 and S6 are turned off (open).

In each switching cycle, the converter 200 operates with a sequence of states in the following order: D1A, DV1, D1B, DV2, D2B, DV3, D2A, DV4 in which DV1, DV2, DV3 and DV4 represent the state DVx following the states D1A, D1B, D2B and D2A, respectively. This sequence is then repeated over time. This sequence achieves the highest switching frequency corresponding to the lowest inductor current ripple.

The voltage conversion ratio follows the equation (3) above. The maximum voltage conversion ratio is $V_{OUT}/V_{IN}=\frac{1}{4}$ for D=0.5. Increasing the duty cycle D above 0.5 results in an operation that shorts the voltage across the flying capacitors. A D>0.5 would create an interval in which the switches from state D1 and D2 are closed in parallel. In this scenario S1, S2, S5 and S6 would be closed at the same time, hence shorting the voltage across both flying capacitors. Note that in this example D represents the relative duration of the states D1 and D2.

Figure 5:
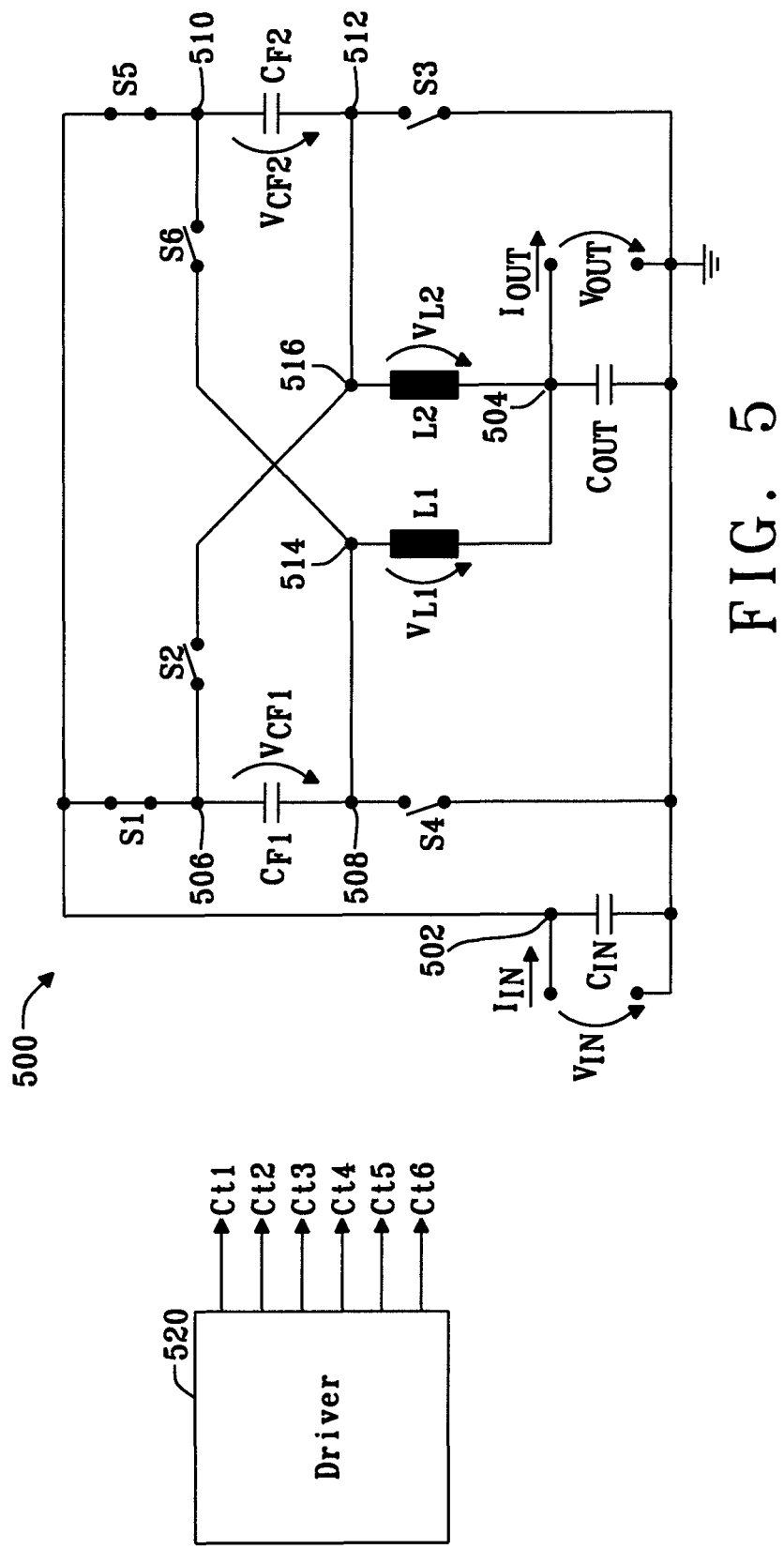
FIG. 5 is a diagram of a power converter provided with a driver adapted to operate the power converter with a sequence of step according to the disclosure.

FIG. 5 is a diagram of a DC-DC converter 500 provided with a driver adapted to operate the power converter with a sequence of steps according to the disclosure. The DC-DC converter 500 includes two capacitors $C_{F1}$, $C_{F2}$ and two inductors L1 and L2 coupled between a first port 502 and a second port 504 via a network of switches formed by six switches S1-S6. The power converter may be operated as a step-down converter or as a step-up converter. When operating as a step-down converter the first port receives an input voltage, and the second port provides the output voltage. Conversely, when the power converter operates as a step-up converter the second port receives an input voltage, and the first port provides the output voltage.

In FIG. 5, the converter 500 is described as a step-down converter, in this case the first port may be referred to as the input port or input node 502, while the second port may be referred to as the output port or output node 504. An input capacitor Cin is provided between the input node 502 and ground and an output capacitor Cout is provided between the output node 504 and ground. The capacitors Cin and Cout are connected to a fixed ground voltage and may be referred to as reservoir capacitors. The capacitors CF1 and CF2 have terminals provided with varying voltages and may be referred to as flying capacitors.

The first flying capacitor CF1 has a first terminal coupled to node 506 and a second terminal coupled to node 508. The second flying capacitor CF2 has a first terminal coupled to node 510 and a second terminal coupled to node 512.

The first inductor L1 has a first terminal at node 514 and a second terminal coupled to the output node 504. Similarly, the second inductor L2 has a first terminal at node 516 and a second terminal coupled to the output node 504.

The first flying capacitor CF1 is coupled to input node 502 via the switch S1 and to ground via the switch S4. Similarly, the second flying capacitor CF2 is coupled to the input node 502 via the switch S5 and to ground via the switch S3.

The first terminal of the inductor L1 is coupled to CF1 at node 508 and to CF2 at node 510 via the switch S6. Similarly, the first terminal of the inductor L2 is coupled to CF2 at node 512 and to CF1 at node 506 via the switch S2.

A driver 520 is provided to generate six control signals Ct1-Ct6 to operate the switches S1-S6 respectively. The driver 520 is configured to open or close various switches to operate the converter in a desired switching state. The driver 520 is also configured to drive the network of switches with a specific sequence of states during a drive period T, also referred to as switching cycle, allowing to extend the conversion ratio $V_{OUT}/V_{IN}$ above 0.25 in the step-down configuration. The sequence of states includes a first state in which the first port (node 502) is coupled to the second port (node 504) via two paths referred to as first path and a second path respectively. The first path includes the first switch S1, the first flying capacitor CF1 and the first inductor L1. The second path includes the second switch S5, the second flying capacitor CF2 and the second inductor L2. In the first state the ground is decoupled from the second port. The driver 520 is also adapted to change a duration of the switching states forming the sequence of states in order to achieve a target conversion ratio.

The first state permits to magnetize both inductors L1 and L2 in parallel from the first port. Using this approach an extended out-to-input voltage conversion ratio can be achieved with higher efficiency and smaller area than conventional converters.

Figure 6:
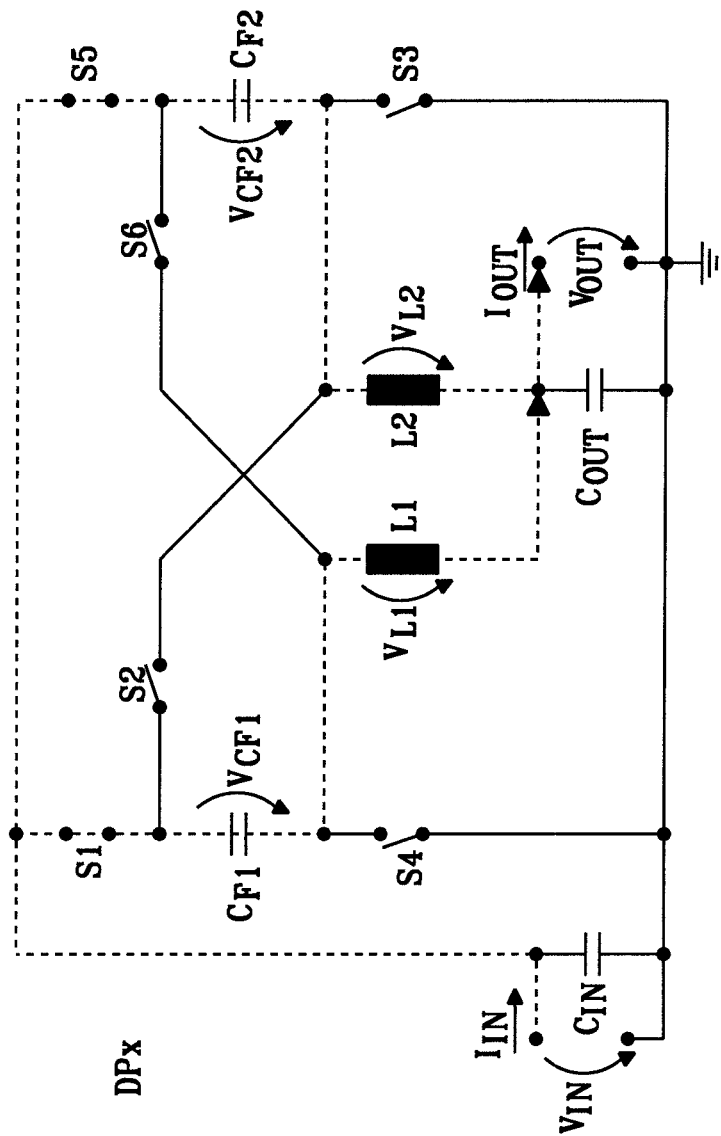
FIG. 6 is a diagram of a dual-magnetization switching state for operating the power converter of FIG. 5.

FIG. 6 illustrates a switching state DPx for operating the converter 500. In the state DPx, the switches S1 and S5 are turned on (closed) and the switches S2, S3, S4 and S6 are turned off (open). The input terminal is coupled to the output terminal via a first magnetization path for magnetizing L1 and a second magnetization path for magnetizing L2. The first magnetization path includes S1, $C_{F1}$, L1, and the second magnetization path includes S5, $C_{F2}$, and L2.

By operating the DC-DC converter 500 for a predetermined amount of time in the switching state DPx it is possible to increase the duty cycle D above 0.5, hence increasing the maximum $V_{OUT}/V_{IN}$ conversion ratio.

Figure 7:
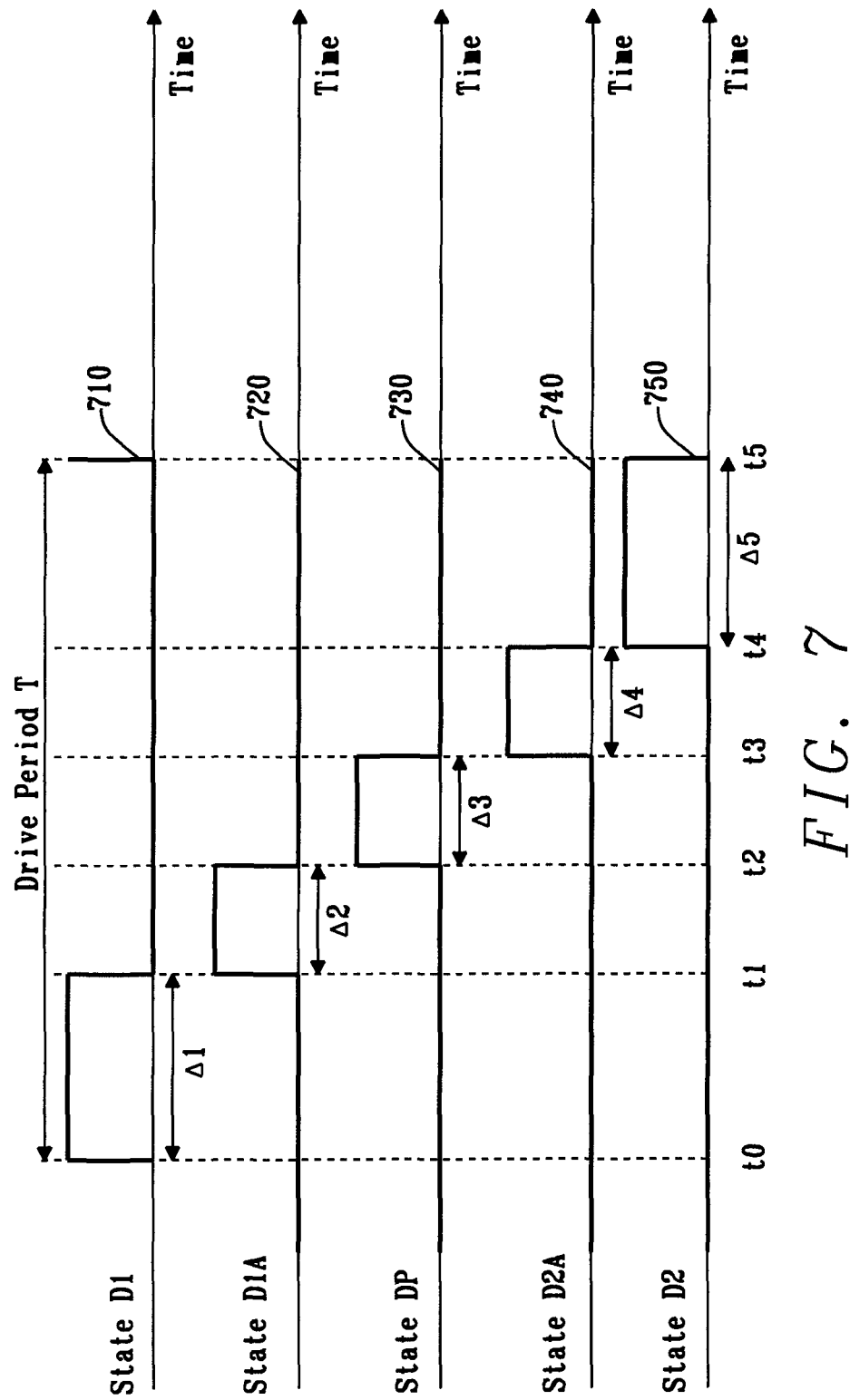
FIG. 7 is a drive sequence for operating the power converter of FIG. 5.

FIG. 7 illustrates a drive sequence for operating the DC-DC converter 500 over a drive period T, also referred to as switching cycle. In this example, the driver 520 drives the DC-DC converter with state D1 (waveform 710), between the times t0 and t1 for a duration Δ1, with the state D1A (waveform 720) between the times t1 and t2 for a duration Δ2, with state DP (waveform 730) between the times t2 and t3 for a duration Δ3, with the state D2A (waveform 740) between the times t3 and t4 for a duration Δ4, and with the state D2 (waveform 750) between the times t4 and t5 for a duration Δ5. This sequence is then repeated over time to deliver the required output power. It will be appreciated that a dead-time may be introduced at times t1, t2, t3, t4 and t5.

The relationship between input and output voltage is obtained by applying the volt-sec balance principle to the voltages of the two inductors $L_1$ and $L_2$:

$$\frac{V_{OUT}}{V_{IN}} = \frac{D+1}{6} \quad D1 = D2 = 1 - D, \quad (4)$$

$$D1A = D2A = DP = \frac{2D-1}{3}$$

$$D \in [0.5, 1]$$

In order to limit losses, it is often preferred to operate the circuit with a balanced current through L1 and L2 (and corresponding switches), also referred to as symmetrical operation. For a symmetrical operation of the converter 500, the durations Δ1 and Δ5 of the state D1 and D2 are the same, Δ1=Δ5. In addition, the durations of the states D1A, D2A and DP are also the same, Δ2=Δ3=Δ4.

The values of Δ1 and Δ2 may be set to achieve a desired conversion ratio. A maximum voltage conversion ratio of $V_{OUT}/V_{IN}=\frac{1}{3}$ can be achieved for D=1. In this case Δ1=Δ5=0 and Δ2=Δ3=Δ4=T/3. Therefore the maximum voltage conversion ratio can be increased by 33% compared with the converters of the prior art. It will be appreciated that the states of the sequence may be arranged in various sequential order as long as the relative duty cycles do not change. For instance, the states D1 and D1A may be swapped, with or without swapping the states D2 and D2A.

The state DPx may be split into two subs states DP1 and DP2. This allows operating the converter with other sequences. The switch configuration of states DP1 and DP2 is identical to the state DPx described in FIG. 6, however in this case, the summed duration of DP1 and DP2 is equal to the duration of the state DP.

Figure 8:
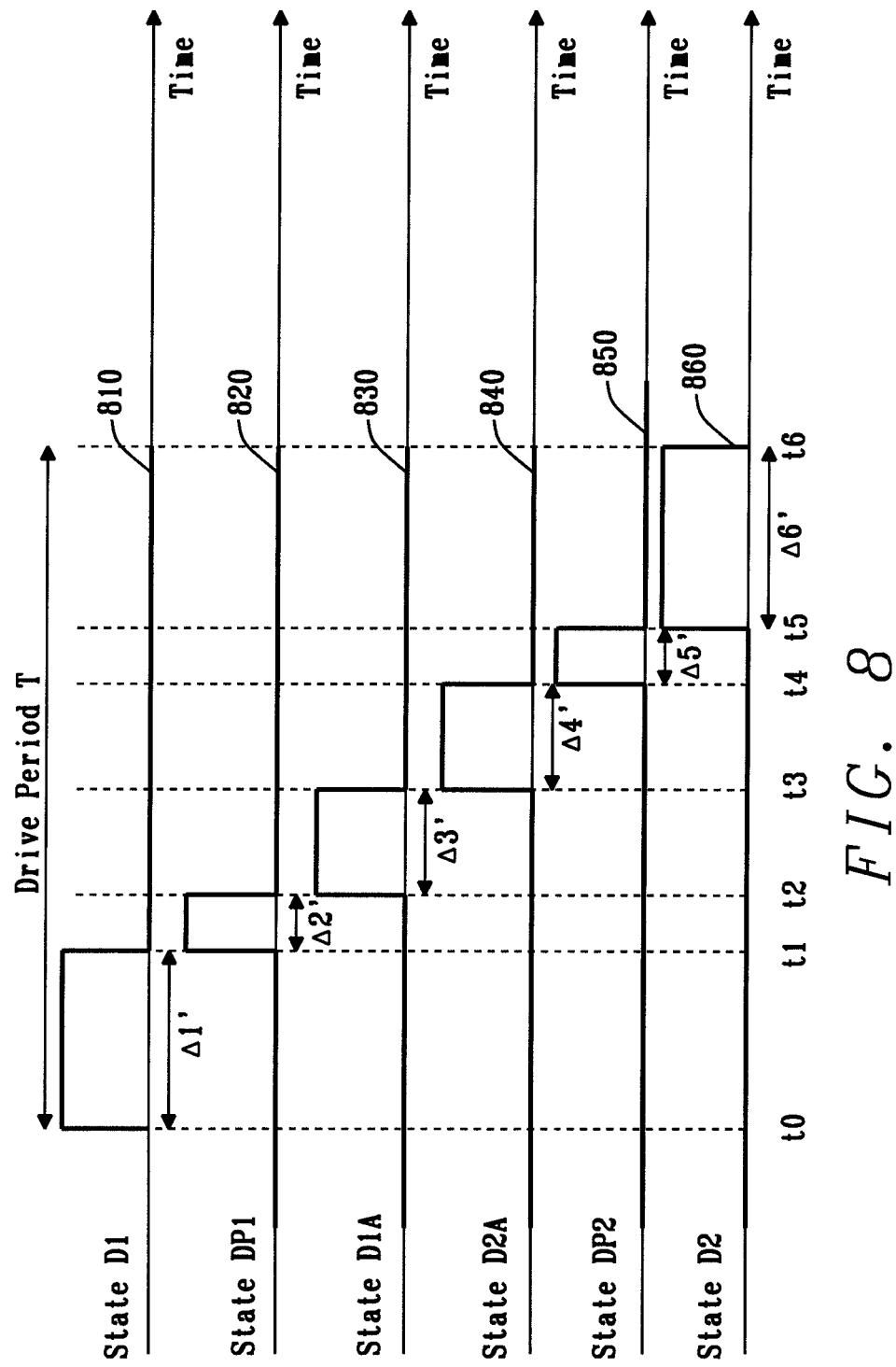
FIG. 8 is another drive sequence for operating the power converter of FIG. 5.

FIG. 8 illustrates another drive sequence for operating the DC-DC converter 500 over a drive period T. In this example, the driver 520 drives the DC-DC converter with state D1 (waveform 810), between the times t0 and t1 for a duration Δ1', with the state DP1 (waveform 820) between the times t1 and t2 for a duration Δ2', with state D1A (waveform 830) between the times t2 and t3 for a duration Δ3', with the state D2A (waveform 840) between the times t3 and t4 for a duration Δ4', with the state DP2 (waveform 850) between the times t4 and t5 for a duration Δ5', with the state D2 (waveform 860) between the times t5 and t6 for a duration Δ6'. This sequence is then repeated over time to deliver the required output power. It will be appreciated that a dead-time may be introduced at times t1, t2, t3, t4, t5 and t6.

For a symmetrical operation of the converter 500, the durations of the state D1 and D2 are the same, Δ1'=Δ6'. In addition, the durations of the states DP1 and DP2 are the same Δ2'=Δ5'. The durations of the states D1A and D2A are also the same, Δ3'=Δ4'=2 Δ2'. In this case the shorter duration Δ2' of the states DP1 (or DP2) leads to lower inductor current ripple. When inserting a DPx state between D1A and D2A the inductor demagnetization is only interrupted once per sequence. However by placing a DPx state between D1 and D1A (or between D2 and D2A) the inductor demagnetization is interrupted twice per sequence. Consequently, the second sequence achieves twice the switching frequency across the inductors and reduces by about half the inductor current ripple. The trade-off is a slight increase in the power loss associated with switch transitions. The switching state DPx may be used to speed-up the converter response to transient load by temporally extending the magnetization duty cycle of both inductors L1 and L2 from maximum 50% (actual) to 100% (if flying capacitance is relatively large in comparison to output current). This reduces the output voltage load drop significantly.

For steady state operation the maximum duty cycle of DP is ⅓ to enable charge balancing across the flying caps through the states D1A and D2A. For transient regulation, the state DP may be driven for 100% duty cycle. This results in a temporal over-charge of the flying capacitors, but also enables a much faster dI/dt inside the inductors. As a result the drop of the converter output voltage from transient load current is reduced. The increase in effective voltage across the flying capacitors (which depends on their capacitance in relation to the inductor current) is corrected automatically after resuming normal operation. The state described in FIG. 6 enables temporally the magnetization of both inductors up to a duty cycle of 100%, resulting in a faster transient load response. In contrast, the prior art can only magnetize each inductor with a maximum duty cycle of 50%.

The use of the switching state DP in combination with switching states D1 and D2 in the driving sequence, forces the voltage across the flying capacitors towards $V_{CF1}=V_{CF1}=V_{IN}/2$. This removes the need for a regulation loop for regulating the voltage across the flying capacitors otherwise required to compensate for variations including non-ideal timings, components and asymmetric parasitic impedances.

The states D1, DP1, D1A, D2A, DP2 and D2 could be arranged in any sequential order as long as the relative duty cycles do not change.

It will be appreciated that the use of driving sequences including the switching state DPx may be extended to converter topologies having more than two switching phases.

The DC-DC converter 500 described in relation to FIGS. 5 to 8 has been described as step-down converter also referred to as Buck converter. It will be appreciated that such a converter may be operated in reverse (that is using the input as the output and the output as the input) as Boost converters to achieve step-up conversion with an extended range of conversion ratios. In this scenario the magnetizing (de-magnetizing) phase in the buck operation becomes a de-magnetizing (magnetizing) phase in the boost operation. When the power converter operates as a step-up converter, the minimum output to input conversion ratio may be extended down to Vout/Vin>3 while including a 50% margin on the duty cycle to respond to transient load release. For instance, the output-to-input conversion ratio may be between 3 and 4. This is better than the minimum output to input conversion ratio of Vout/Vin>6, achieved by the prior art under the same conditions.

FIG. 9 is a flowchart for a method of converting power with an output-to-input conversion ratio. The method comprises step 910, providing a power converter having a ground port, a first port, and a second port, wherein when the power converter operates as a step-down converter the first port receives an input voltage and the second port provides an output voltage and when the power converter operates as a step-up converter the second port receives an input voltage and the first port provides the output voltage. The method also comprises step 920, driving a network of switches with a sequence of states during a drive period, the sequence of states comprising a first state, wherein in the first state the first port is coupled to the second port via a first path and a second path, wherein the first path comprises the first switch, the first flying capacitor and the first inductor, and wherein the second path comprises the second switch, the second flying capacitor and the second inductor; wherein the ground port is decoupled from the second port.

A skilled person will appreciate that variations of the disclosed arrangements are possible without departing from the disclosure. For instance, the flying capacitors may be implemented as single or multiple capacitors connected in series and/or in parallel. Alternatively a capacitor network may be used. Such a capacitor network may change configuration during the operation of the converter. Accordingly, the above description of the specific embodiment is made by way of example only and not for the purposes of limitation. It will be clear to the skilled person that minor modifications may be made without significant changes to the operation described.

What is claimed is:

1. A power converter for providing an output voltage with an output-to-input conversion ratio, the power converter having a ground port, a first port, and a second port, wherein when the power converter operates as a step-down converter the first port receives an input voltage and the second port provides the output voltage and when the power converter operates as a step-up converter the second port receives an input voltage and the first port provides the output voltage; the power converter comprising a first flying capacitor and a second flying capacitor coupled to a network of switches,
 a first inductor between the first flying capacitor and the second port;
 a second inductor between the second flying capacitor and the second port;
 and a driver;
the network of switches comprising
 a first switch to couple the first flying capacitor to the first port;
 a first ground switch to couple the first flying capacitor to ground;
 a second switch to couple the second flying capacitor to the first port;
 a second ground switch to couple the second flying capacitor to ground;

the driver being adapted to drive the network of switches with a sequence of states during a drive period, the sequence of states comprising a first state, wherein in the first state the first port is coupled to the second port via a first path and a second path, wherein the first path comprises the first switch, the first flying capacitor and the first inductor, and wherein the second path comprises the second switch, the second flying capacitor and the second inductor; wherein the ground port is decoupled from the second port.

2. The power converter as claimed in claim 1, wherein the sequence of states comprises a second state configured to magnetize the first inductor and de-magnetize the second inductor when the power converter operates as a step-down converter or to de-magnetize the first inductor and magnetize the second inductor when the power converter operates as a step-up converter.

3. The power converter as claimed in claim 2, wherein the sequence of states comprises a third state configured to de-magnetize the first inductor and magnetize the second inductor when the power converter operates as a step-down converter or to magnetize the first inductor and de-magnetize the second inductor when the power converter operates as a step-up converter.

4. The power converter as claimed in claim 3, wherein the driver is adapted to maintain the first state, the second state and the third state for a same predetermined duration during the drive period.

5. The power converter as claimed in claim 2, wherein the sequence of states comprises multiple occurrences of the first state, and wherein a sum of the multiple occurrences of the first state last for a same duration as the duration of the second state or the duration of the third state.

6. The power converter as claimed in claim 5, wherein the sequence of states is provided with two occurrences of the first state.

7. The power converter as claimed in claim 6, wherein the driver is adapted to maintain the second state and the third state for a same predetermined duration, and to maintain the first occurrence of the first state and the second occurrence of the first state for a duration equal to half the predetermined duration of the second and third states.

8. The power converter as claimed in claim 2, comprising a first inductor switch and a second inductor switch, wherein the first inductor switch has a first terminal coupled to the first switch and the first flying capacitor and a second terminal coupled to the second inductor; and wherein the second inductor switch has a first terminal coupled to the second switch and the second flying capacitor and a second terminal coupled to the first inductor.

9. The power converter as claimed in claim 8, wherein in the second state the ground port is coupled to the second port via a path comprising the second ground switch the second flying capacitor, the second inductor switch and the first inductor and via another path comprising the second ground switch and the second inductor; and wherein in the third state the ground port is coupled to the second port via a path comprising the first ground switch, the first flying capacitor, the first inductor switch and the second inductor and via another path comprising the first ground switch and the first inductor.

10. The power converter as claimed in claim 8, wherein the sequence of states comprises a fourth state in which the ground port is coupled to the second port via a path comprising the second ground switch, the second flying capacitor, the second inductor switch and the first inductor and via another path comprising the second ground switch and the second inductor, and wherein the first port is coupled to the second port via a path comprising the first switch, the first flying capacitor and the first inductor.

11. The power converter as claimed in claim 10, wherein the sequence of states comprises a fifth state in which the ground port is coupled to the second port via a path comprising the first ground switch, the first flying capacitor, the first inductor switch and the second inductor and via another path comprising the first ground switch and the first inductor, and wherein the first port is coupled to the second port via a path comprising the second switch, the second flying capacitor and the second inductor.

12. The power converter as claimed in claim 1, wherein when the power converter operates as a step-down converter, the driver is configured to magnetize the first inductor and the second inductor for more than fifty percent of the drive period.

13. The power converter as claimed in claim 1, wherein when the power converter operates as a step-up converter, the driver is configured to de-magnetize the first inductor and the second inductor for more than fifty percent of the drive period.

14. The power converter as claimed in claim 1, wherein when the power converter operates as a step-down converter, the output-to-input conversion ratio is greater than 0.25, and when the power converter operates as a step-up converter, the output-to-input conversion ratio is smaller than 4.

15. A method of converting power with an output-to-input conversion ratio, the method comprising
providing a power converter having a ground port, a first port, and a second port, wherein when the power converter operates as a step-down converter the first port receives an input voltage and the second port provides the output voltage and when the power converter operates as a step-up converter the second port receives an input voltage and the first port provides the output voltage; the power converter comprising a first flying capacitor and a second flying capacitor coupled to a network of switches,
a first inductor between the first flying capacitor and the second port;
a second inductor between the second flying capacitor and the second port;
the network of switches comprising
a first switch to couple the first flying capacitor to the first port;
a first ground switch to couple the first flying capacitor to ground;
a second switch to couple the second flying capacitor to the first port;
a second ground switch to couple the second flying capacitor to ground;
and
driving the network of switches with a sequence of states during a drive period, the sequence of states comprising a first state, wherein in the first state the first port is coupled to the second port via a first path and a second path, wherein the first path comprises the first switch, the first flying capacitor and the first inductor, and wherein the second path comprises the second switch, the second flying capacitor and the second inductor; wherein the ground port is decoupled from the second port.

* * * * *